No. 751,989. PATENTED FEB. 9, 1904.
P. F. MURPHY.
TRAP FOR CATCH BASINS.
APPLICATION FILED MAR. 9, 1903.
NO MODEL.

WITNESSES:

INVENTOR.
Peter F. Murphy
BY
ATTORNEYS.

THE NORRIS PETERS CO., PHOTO-LITHO., WASHINGTON, D. C.

No. 751,989.

Patented February 9, 1904.

UNITED STATES PATENT OFFICE.

PETER F. MURPHY, OF MILWAUKEE, WISCONSIN.

TRAP FOR CATCH-BASINS.

SPECIFICATION forming part of Letters Patent No. 751,989, dated February 9, 1904.

Application filed March 9, 1903. Serial No. 147,023. (No model.)

*To all whom it may concern:*

Be it known that I, PETER F. MURPHY, a citizen of the United States, residing at Milwaukee, county of Milwaukee, and State of Wisconsin, have invented new and useful Improvements in Traps for Catch-Basins, of which the following is a specification.

My invention relates to improvements in traps for catch-basins.

In the construction of catch-basins it is desirable that the valve-chamber and inlet-bend of the trap be so formed that they will not extend beneath the inlet-opening of the catch-basin, as in such event the sewage as it enters the basin would fall and accumulate upon the valve-chamber and other exposed portions of the trap above the water-line and would become putrid and produce foul odors, which would not occur if free to fall direct to the bottom of the basin.

The object of my invention is to provide a trap of such construction and arrangement of parts that the same may be located so closely to one side of the basin that the sewage in entering the basin through the grating will not fall or accumulate upon it, but will be free to drop to the bottom of the basin, while the hand-opening of the valve-chamber is so located that the valve therein is readily accessible from the inlet-opening of the basin.

My invention relates further to the peculiar construction and arrangement of the valve and seat in relation to the other parts of the trap.

The construction of my device is explained by reference to the accompanying drawings, in which—

Figure 1:
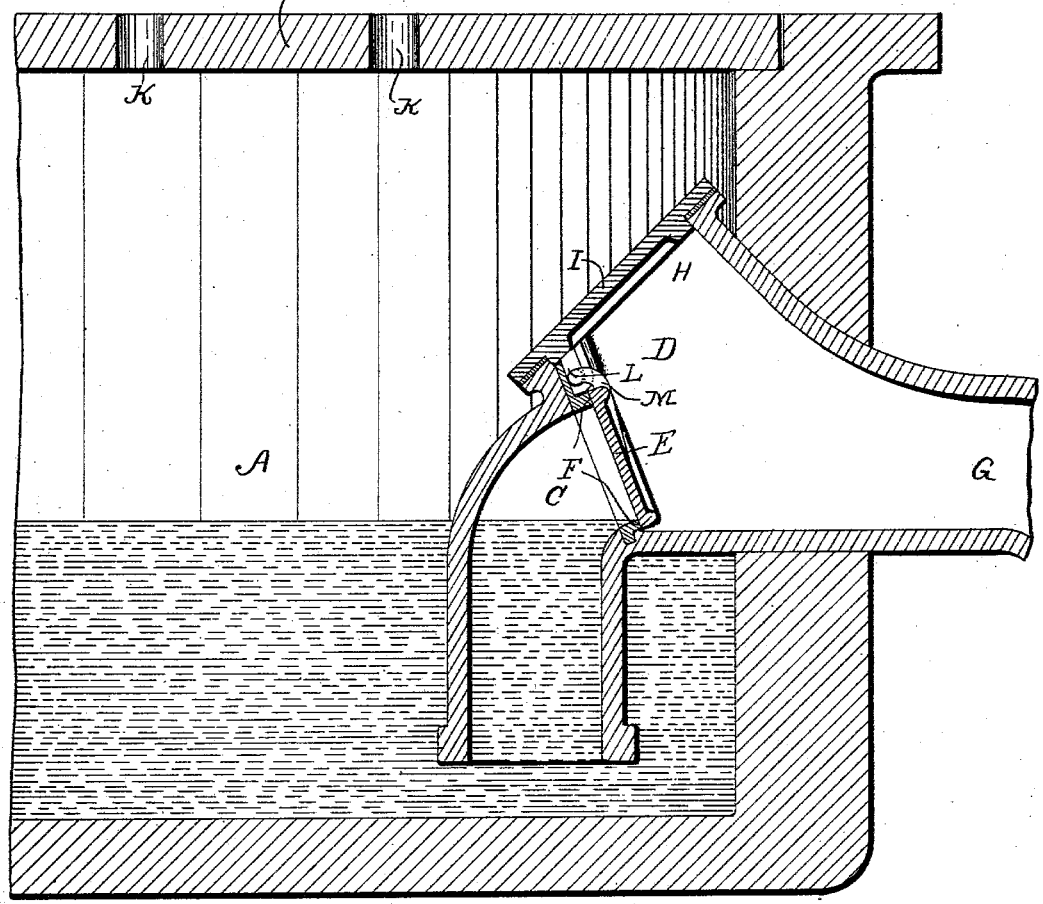
Figure 2:
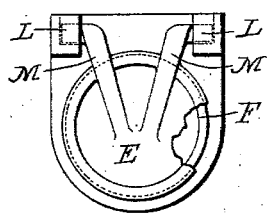
Figure 3:
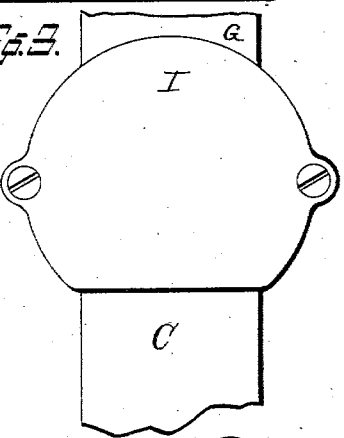

Figure 1 represents a vertical section thereof. Fig. 2 represents a front view of the valve and seat removed from the trap. Fig. 3 is a top view of the valve-chamber.

The catch-basin comprises the receptacle A and the removable perforated or grated cover B. The trap comprises the vertical inlet bend C, valve-chamber D, valve E, valve-seat F, and horizontal outlet-duct G. The valve-chamber D is provided with a hand-opening H, which is closed with a cover I. By my construction the hand-opening H is formed at such an angle to the outlet-bend that it is readily accessible from the inlet-opening K of the basin above. Notwithstanding the fact that the trap is so located at one side of the opening K as to be shielded from contact with falling sewage its interior is readily accessible through the opening K of the basin.

To insure the proper seating of the valve E, the valve-seat F and hinge-bearings L are formed integrally from a single piece of metal. The valve E and its seat are then fitted together, when the valve-seat with the hinge-bearings are secured in place in the body of the trap in any convenient manner, when the valve is readily dropped into its place, the same being suspended by its arms M from the hinge-bearings L, as indicated in Figs. 1 and 2.

It will of course be understood that the vertical inlet-bend extends down below the water-line in the basin, whereby the escape of gas from the sewer through the trap when supplied with water is prevented. It will also be understood that the water from the sewer is prevented from backing up in the basin by the valve E and that said valve will prevent the escape of gas in case the water evaporates. When, however, the traps are so located that there is no liability of water backing up into the basin, the valve E may be dispensed with.

I do not claim herein, broadly, the peculiar construction of the valve-supporting hinge mechanism shown in Figs. 1 and 2, but reserve my right to broadly claim the same in an application to be hereafter made by me.

Having thus described my invention, what I claim as new, and desire to secure by Letters Patent, is—

1. A trap for catch-basins comprising a vertical inlet bend or portion; a horizontal outlet bend or portion terminating with an inward, upward curve above the inlet bend or portion, provided with a hand hole or opening formed at an oblique angle to the horizontal bend or portion and a removable cover for closing said hand hole or opening.

2. A trap for catch-basins comprising a vertical inlet bend or portion; a horizontal outlet bend or portion enlarged laterally and upwardly to form a receiving-chamber above and at the junction of said horizontal and vertical bends or portions; a hand-opening provided with a suitable cover located above the junction of said horizontal and vertical bends or portions and a valve located in said receiving-chamber at the junction of said vertical bends or portions, substantially as set forth.

3. A trap for catch-basins comprising a vertical inlet bend or portion; a horizontal outlet bend or portion enlarged laterally to form a receiving-chamber at the junction of said bends or portions, said chambers being extended upwardly at an oblique angle to said horizontal bend or portion; a hand-opening formed at an oblique angle to the vertical bend or portion; a cover for closing said hand-opening and a valve located in said chamber, substantially as, and for the purpose specified.

4. The combination with a catch-basin provided with a cover, having a grated central portion and a solid marginal portion, of a trap comprising a vertical inlet bend or portion, a horizontal outlet bend or portion terminating with an inward, upward curve above said vertical portion, and a hand-opening formed at an oblique angle to and located at the junction of said inlet and outlet bends or portions beneath the solid marginal portion of the cover, as set forth.

5. The combination with a catch-basin provided with a cover, having a grated central portion and a solid marginal portion, of a trap comprising a vertical inlet bend or portion, a horizontal outlet bend or portion terminating with an inward, upward curve or bend above said vertical portion, a valve located at the junction of said horizontal and vertical bends or portions and a hand-opening provided with a suitable cover located at an oblique angle to the horizontal bend or portion at the mouth of said inward, upward curve or bend beneath the ungrated or solid part of the cover of the catch-basin above, as set forth.

In testimony whereof I affix my signature in the presence of two witnesses.

PETER F. MURPHY.

Witnesses:
JAS. B. ERWIN,
N. C. TAUGHER.